Figure 1:
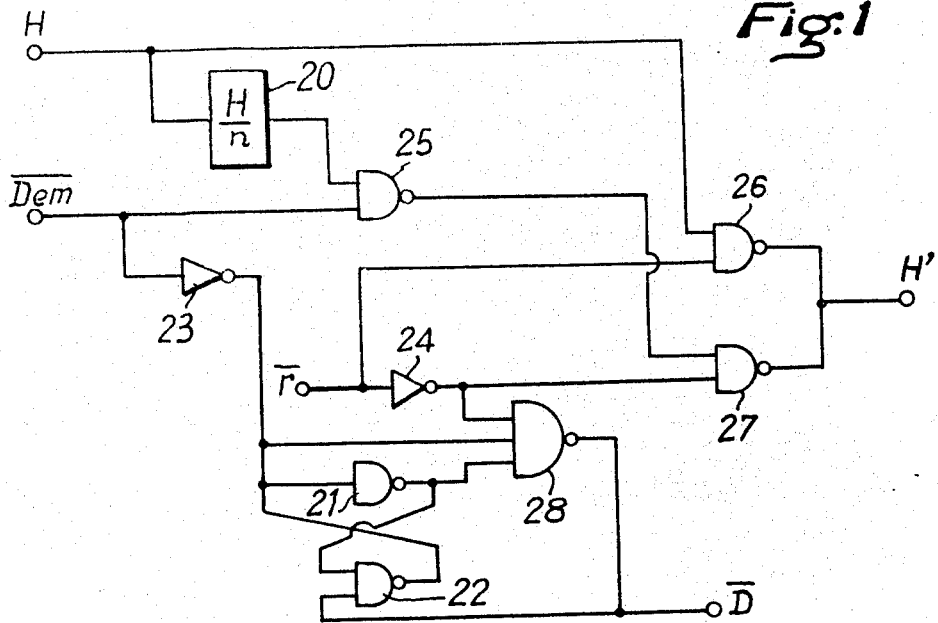

United States Patent [19]
Monpetit

[11] 3,953,716
[45] Apr. 27, 1976

[54] CONTROL APPARATUS AND PROCESS FOR COMBUSTION ENGINES

[75] Inventor: Louis Monpetit, L'Etang-la-Ville, France

[73] Assignee: Agence Nationale de Valorisation de la Recherche (ANVAR), Neuilly-sur-Seine, France

[22] Filed: Aug. 27, 1974

[21] Appl. No.: 500,907

[30] Foreign Application Priority Data
Aug. 28, 1973 France .......................... 73.31027

[52] U.S. Cl. ...................... 235/150.21; 235/92 CC; 235/92 T; 235/92 TF; 307/293; 328/48; 328/129
[51] Int. Cl.² ..................... F02D 5/00; F02D 37/02; G05B 15/02
[58] Field of Search ......... 235/150.21, 92 T, 92 TF, 235/92 FQ, 92 CC, 92 PE; 307/293; 328/48, 129

[56] References Cited
UNITED STATES PATENTS

| | | | |
|---|---|---|---|
| 3,696,303 | 10/1972 | Hartig | 328/48 |
| 3,840,174 | 10/1974 | Craft | 235/92 CC |
| 3,846,625 | 11/1974 | Sasayama | 235/151.21 |

Primary Examiner—Felix D. Gruber
Attorney, Agent, or Firm—Darby & Darby

[57] ABSTRACT

Method and apparatus for producing a control function signal of a given duration for a fuel injection system of an engine in which a word, or number, corresponding to the desired control function is set into a first counter to define a first number of pulses to be counted. The frequency of the pulses applied to the counter is controlled in response to an operating parameter. A second counter counts a second number of the pulses and the two numbers of pulses define two time intervals which are added. A third counter counts a signal representative of the time interval produced by the addition of the two time intervals and a predetermined number of said signals are counted by the third counter to define the duration of the control signal.

7 Claims, 2 Drawing Figures

CONTROL APPARATUS AND PROCESS FOR COMBUSTION ENGINES

The invention concerns a control process and apparatus for combustion engines, particularly for motor vehicles.

In French pat. No. 72 43329, corresponding to U.S. application Ser. No. 422,062, filed Dec. 5, 1973, now U.S. Pat. No. 3,904,856, granted Sept. 9, 1975, a control apparatus and process for combustion engines is described in which the data furnished by pickups measuring physical quantities connected with the operation of the engine are coded in the form of word segments which are grouped to form a first word. The first word is converted by a programmed memory into a second word which is itself transformed into a linear engine-regulating function. This linear regulating function permits adjusting the fuel injection time, for example. In this system, the transformation of the second word into a regulating function occurs in analog form, and the corresponding electronic device for making the transformation is relatively expensive.

In order to avoid this disadvantage, copending application Ser. No. 493,921, filed Aug. 1, 1974, which is assigned to the same assignee, describes a control apparatus and process for combustion engines in which a regulating function, for example one capable of defining a duration of the fuel injection, is coded in numerical form to constitute a word. The circuit of that application includes a first preselection counter to which this word is applied in order to determine the number of pulses to be counted. A second, or threshold, counter, for counting a second number of pulses before the said first counter begins to count is also available. A third counter counts a pulse each time that the first two counters have completed their counting. The counting of a predetermined number of pulses by the third counter establishes the duration of the control function signal.

In the case where the duration signal determined by the foregoing circuit corresponds to a fuel injection duration, it is desirable to increase this duration when the motor and/or the indrawn air are cold. The foregoing circuit does not have this capability.

Accordingly, the present invention relates to an improvement in a circuit of the type described in the aforesaid copending application Ser. No. 493,921 in that it provides a circuit for regulating the duration of the injection signals as a function of the temperature of the engine. In accordance with the invention, a temperature correction circuit is provided for the circuit for producing the control function signals. As in the case of application Ser. No. 493,921, a set of pulse counters determines the duration of the control signal. In the present invention a divider reduces the frequency of the pulses applied to the counters as a function of the engine temperature. The correction circuit also includes two electronic gates, one fed with pulses of the original frequency and the other with pulses of the divided frequency, each of the gates receiving in addition, a signal which is a function of the engine temperature to control their opening and closing.

According to another aspect of the invention, a starting signal blocks the effect of the frequency divider and insures, by means of a bistable circuit, the control of a starting injection.

An embodiment of the correction circuit according to the invention is shown in FIG. 1 in schematic form.

Figure 2:
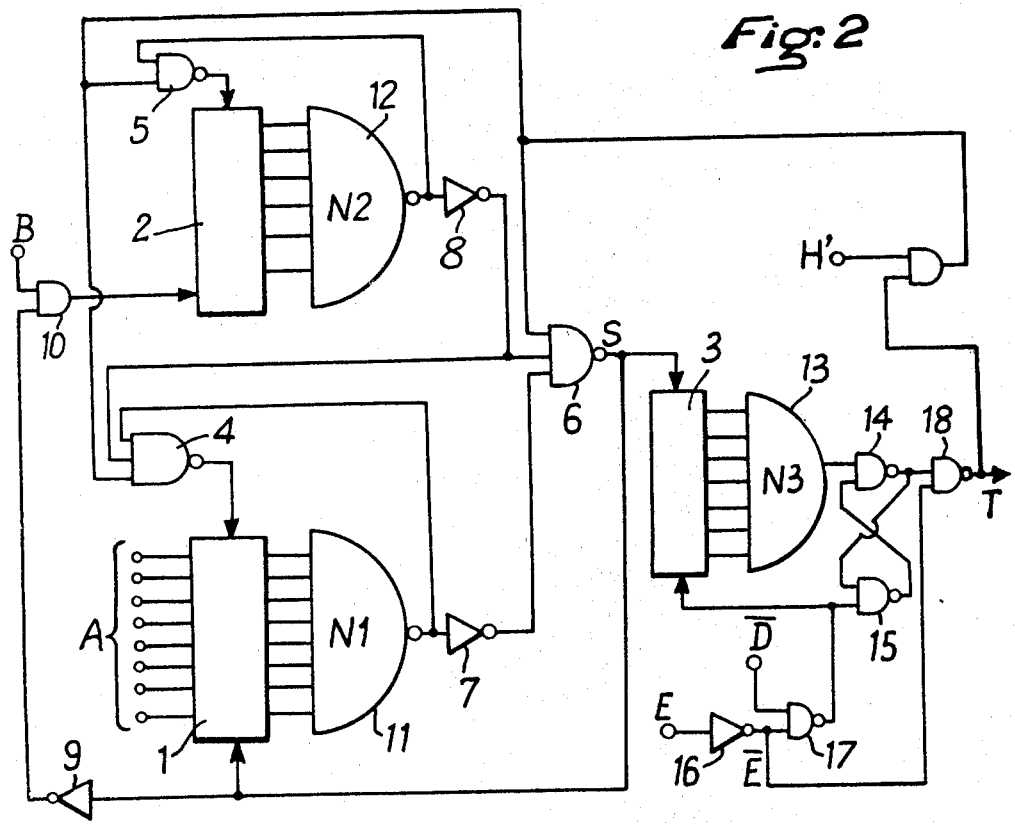

FIG. 2 is a schematic diagram of the basic circuit for producing the control function signal showing the points of connection of the circuits of the subject invention.

Referring to FIG. 2, three electronic pulse counters 1, 2, 3 are provided for counting, respectively, N1, N2 and N3 pulses. The other elements in the circuit are electronic gates and inverters.

A signal E at the input of an inverter 16 is the signal triggering the start of the control duration signal T. In the example described, in which T defines the duration of a fuel injection, signal E is the signal triggering the injection.

The circuit of FIG. 2 operates so that pulses H' are provided to the input of counter 2 which counts N2 of these pulses. In response to the count of N2 pulses, an AND type gate 12 produces an output signal which unblocks the input of counter 1 to count N1 pulses. The number N1 is set by a control word A applied to the inputs of counter 1. The control word defines the function of the control signal to be produced. After N1 pulses are counted by 1, the next H' pulse passes through an AND type gate 12, an inverter 7 and NAND type gate 6 to a counter 3 and resets counters 1 and 2 to zero. This starts the counting cycle of N1 + N2 pulses over again to produce another pulse to be supplied to counter 3. The cycle repeats until counter 3 has counted N3 pulses at which time it produces an output signal to terminate the production of the T signal. Counter 2 sets a threshold count and can be blocked, if desired. The duration of the counting by the three counters 1, 2 and 3 defines the injection duration, the signal delivered at the end of counting by the output circuit 18 being the end-of-injection signal. The operation of this cicuit is described in greater detail in the aforementioned application.

According to the invention, a correction which is a function of characteristic temperatures of the motor is introduced by the circuit of FIG. 1, to alter the duration of signal T.

The circuit of FIG. 1 has two outputs. One of them, H' is connected at point H' in FIG. 2 and delivers the pulses to be counted. The other output $\overline{D}$ is connected to terminal $\overline{D}$ in FIG. 2, an input to a gate 17, and delivers an injection signal as the motor is started.

The circuit of FIG. 1 has three inputs. At the first one, pulses of a predetermined frequency H arrive. These are produced, for example, by a clock pulse generator. At input $\overline{Dem}$, a motor starting control signal may be applied. At the third input, the temperature correction signal $\bar{r}$, representative of a cyclic ratio R, which is less than 1, is applied.

The period of the temperature correction signal $\bar{r}$ is fixed. Its value is relatively unimportant, provided it is greater than the period of the pulses H/n and much smaller than the duration defined by the numerical control word A applied to counter 1, that is, less than the time it takes counter 1 to count N1 of the H' pulses.

The circuit includes a frequency divider 20 which divides the pulse frequency H by n where n is an integer, for example n = 2, 3 or 4. A bistable circuit 21–22, inverters 23, 24 and electronic gates 25 to 28, all illustratively shown as being of the NAND type, are also provided.

The functioning of the correction circuit is as follows, in the absence of a starting signal $\overline{Dem}$.

The ratio R insures a correction of the injection duration T. This is demonstrated by the following. With $T_E$ being the duration of a cycle and f the frequency of pulses from H, during $T_E$, the number of pulses coming from H' is:

$$n_i = (T_E \cdot R) f/n + T_E (1 - n) \cdot f \quad (1)$$

The corrected injection duration is then:

$$T_{corr} = \frac{T_E}{n_i} = \frac{1}{\left(\frac{R}{n} + 1 - R\right) f} = \frac{T}{1 + R \left(\frac{1}{n} - 1\right)} \quad (2)$$

so that, $$T_{corr} = \frac{T}{1 - \left(\frac{n-1}{n}\right) \cdot R} \quad (3)$$

In this formula, n is an integer selected from the values 2, 3 or 4, and R is a function of the motor temperatures in such a way that, when the temperatures are low, duration Tcorr will be larger than duration T. The ratio R has a value between 0 and 1. When the engine is hot, R = 0, and when it is cold, R = 1.

In the circuit, the pulses H' are either of the frequencies H or H/n depending on whether the pulses are passed by gates 26 or 27, that is to say, depending on the state of the signal r. The signal r is a periodic rectangular signal, high during one part (r) of the cycle, and low during the other (1 − r), the periodic ratio (high to low) having the value R. We can therefore speak of the presence or the absence of the signal r, corresponding respectively to the high state or low state of the rectangular signal. The r signal is produced, for example, by an analog-to-digital converter which is connected to a temperature sensor (transducer) associated with the engine.

Due to the presence of inverter 24, whose output is connected to one input of gate 27, gates 26 and 27 receive complementary $\bar{r}$ signals. Therefore, these gates can pass the pulses applied to their other inputs not simultaneously but alternately in the course of the cycle defined by r. When signal r is high, the pulses of frequency H/n will pass gate 25, which is open due to the absence of $\overline{Dem}$ and will also pass gate 27 to be the H' pulses. When r is low, gate 27 is closed and gate 26 is open so it will be the pulses of frequency H which will pass to the H' output.

Thus, when the motor is cold, the frequency H/n of the pulses counted during a part of each cycle, stretches out the counting duration, that is to say the duration of the injection signal in the example described. This is so because fewer H' pulses are passed to the counters 1 and 2 of FIG. 2.

Inasmuch as the period of the signal r is much smaller than the counting duration, we obtain an averaging effect, embodying a corrected duration Tcorr based on the above equation.

When the motor is hot, R = 0, gate 27 is blocked, and the only pulses counted are of frequency H. The injection duration is then not corrected.

When starting the motor, the frequency divider 20 is blocked by means of gate 25 to which a signal $\overline{Dem}$ is applied. As a result, gate 27 no longer delivers pulses, whatever the state of signal r applied to its other input.

During the actuation of the starter, gate 26 allows pulses of frequency H to pass to produce the H' pulses, but if the motor is cold, while signal r is high, no pulse is delivered at H' since gate 26 is also blocked. The circuit acts as if the division factor n tended toward infinity, the frequency of the pulses supplied by the divider being zero. The corrected duration is then:

$$T_{corr} = T/(1 - R).$$

This value actually depends on the temperature of the motor, it is well defined but quite different from the duration obtained in normal cold operation for a given value of the division factor n.

When the motor is hot, R = 0. H pulses pass through gate 26 and the injection duration during starting is equal in this case to the duration of a normal injection.

When the motor is cold, there are no pulses while signal r is high, and pulses of frequency H while r is low. As another example, the engine is rather cold, say R = 0.75 - ¾, then the signal r is high during ¾ of the cycle and low during the last quarter. The signal $\bar{r}$ is therefore low during ¾ of the cycle and high during ¼.

The signal which triggers the starting pulse is transmitted to the circuit in FIG. 2 at D, by means of gate 28. The bi-stable circuit 21–22 avoids repetition of this signal. The circuit of FIG. 2 is the same as that described in the aforesaid application Ser. No. 493,921.

Within the scope of the invention we therefore embody a correction circuit which functions in response to characteristic temperatures of the motor, utilizing logic circuits and pulses. Therefore, the circuit can be embodied wholly in the form of an integrated circuit, and can be included in the same integrated circuit as the duration computer circuit described in the aforementioned application.

Without departing from the scope of the invention, any other parameter which is to act by multiplicative correction on the duration defined by the numerical word, and capable of being represented by a signal of variable cyclic ratio R, can be substituted for the temperatures mentioned. The signal of cyclic ratio R can also represent a combination of different parameters.

What is claimed is:

1. In apparatus of the type for producing a regulating function control signal of a given duration for controlling the fuel supply system of a combustion engine in response to a coded word defining the duration of said signal in which the apparatus includes:

means for producing counting signals, first presettable counter means receiving said counting signals and having a first predetermined count set therein by said coded word, said first counter means defining a first predetermined period when said predetermined count is reached, second counter means, first means for providing a said counting signal to said second counter means upon each termination of said first predetermined period established by said first counter means counting said first predetermined count, said second counter means counting a second predetermined number of said counting signals representative of a predetermined number of said first periods, and means responsive to the counting signals counted by said second counter means for producing said given duration for said regulating function control signal, the improvement comprising means responsive to an operating parameter of the engine whose fuel supply is being controlled for controlling the frequency of production of said counting signals.

2. Apparatus as in claim 1 wherein the improvement further comprises said means for producing said counting signals including means for producing said signals at a first frequency and said controlling means controlling said counting signal producing means to produce signals at a frequency which is a fraction of said first frequency in response to a given condition of the said operating parameter of the engine.

3. Apparatus as in claim 2 wherein the improvement further comprises said controlling means operating said counting signal producing means to divide the first frequency of the counting signals in response to a dual state cyclically varying signal of a fixed period the duration of each state of the cyclically varying signal being a function of the said operating parameter of the engine.

4. Apparatus as in claim 2 wherein the improvement further comprises means responsive to a signal indicating another operating condition of the engine for preventing the first counter means from receiving the counting signals of lsser frequency.

5. Apparatus as in claim 4 wherein said other operating condition is the starting of the engine.

6. Apparatus as in claim 5 wherein the improvement further comprises second means responsive to the signal indicating the starting of the engine for initiating the passing of the counting signals to said first counter means, said second means preventing a repetition of the initiation.

7. Apparatus as in claim 1 wherein the improvement further comprises that the said operating parameter is the temperature of the engine with which the apparatus is operating.

* * * * *